Jan. 28, 1958
H. FLECKENSTEIN ET AL
2,821,640
ELECTRIC MOTOR
Filed Feb. 7, 1955
FIG. 1.
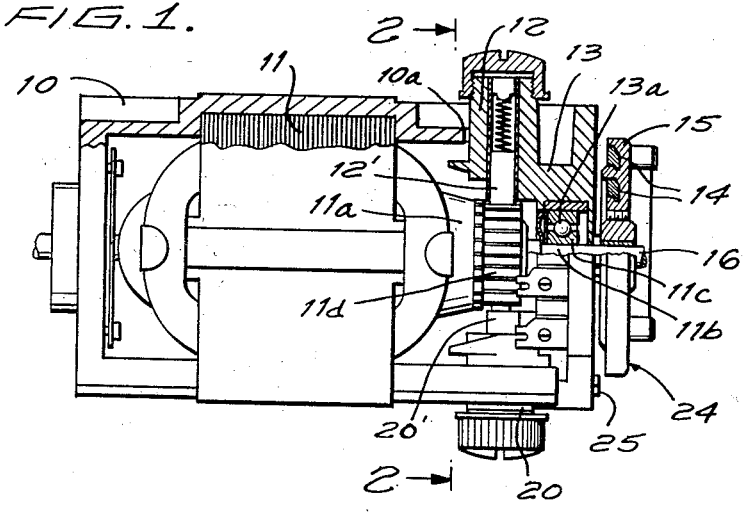
FIG. 2.
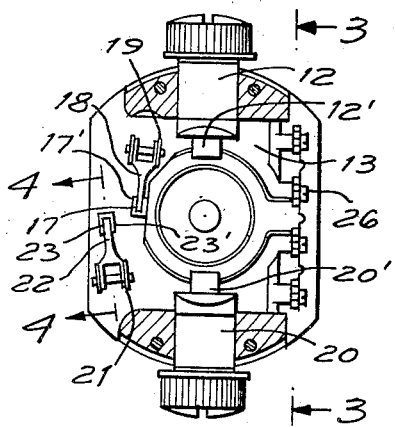
FIG. 3.
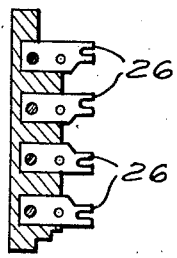
FIG. 4.
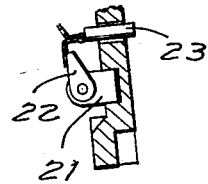
FIG. 6.
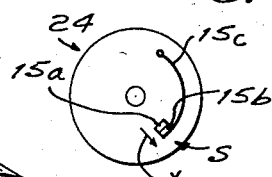
FIG. 5.
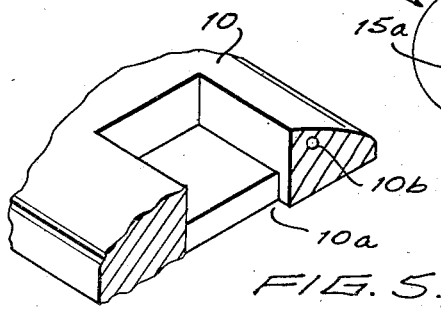
FIG. 7.
INVENTORS
Hans Fleckenstein and
Günter Steinert
BY
Michael S. Striker
agt.

United States Patent Office 2,821,640
Patented Jan. 28, 1958

2,821,640

ELECTRIC MOTOR

Hans Fleckenstein and Günter Steinert, Oldenburg, Germany, assignors to Licentia Patent-Verwaltungs-G. m. b. H., Hamburg, Germany Application February 7, 1955, Serial No. 486,611

7 Claims. (Cl. 310—68)

The present invention relates to electric motors.

More particularly, the present invention relates to electric motors, such as universal motors, which are provided with a rotational speed responsive control.

There exist small series-wound motors capable of delivering up to ¼ H. P. or ½ H. P. which are designed to operate on either direct or alternating current, and so are called "universal motors." Motors of this type operating at speeds of 3,000 to 10,000 R. P. M. are commonly used for vacuum cleaners, portable tools, food mixers and similar devices, and are sometimes provided with governors for limiting no-load speed and for affording speed adjustment. The governor may consist of a centrifugal switch, connected to the supply line, which switch opens and thereby inserts a resistance in the line when a predetermined rotational speed is attained.

However, considerable difficulty has been encountered in the past in the construction of universal motors which are provided with rotational speed responsive controls when the motors must operate noiselessly as well as at constant speeds within very close limits, such as when the motors are to be used in office machines and the like. Very careful design of the various motor elements, particularly of the brush supporting structure, is necessary to minimize excessive brush chatter at high speeds, and not satisfactory brush support arrangement is known which is capable of simultaneously supporting a set of carbon or other brushes through which electric rotor current may be supplied to the rotor of a universal motor as well as a set of brushes through which the opening and closing action of a rotatably mounted centrifugal switch may be transmitted to the stationary parts of the motor.

Furthermore, known universal motors are not sufficiently compact for many purposes, nor do they provide any suitable arrangement whereby the several brushes and a source of electric power may be readily interconnected.

It is therefore one of the objects of the present invention to overcome the above disadvantages by providing an electric motor which is capable of running noiselessly at high speeds, so as to be particularly adapted to be used in conjunction with office machines and the like.

It is another object of the present invention to provide an electric motor capable of running at constant speeds irrespective of normal fluctuations of the voltage of the power source to which the motor is connected.

It is also an object of this invention to provide a very compact electric motor which may be mass-produced very inexpensively.

The objects of the instant invention also include the provision of a universal motor which is equipped with a governor for limiting the rotational speed of the motor within predetermined limits.

It is yet another object of the present invention to provide a governor which may advantageously be used in conjunction with electric motors, particularly universal motors.

The objects of this invention further include the provision of an electric motor of the universal type which will give long periods of trouble-free service.

With the above objects in view, the present invention mainly consists of an electric motor which includes a substantially U-shaped support frame having a base portion and two leg portions. A stator member is stationarily supported by the support frame between the leg portions thereof, and a rotor member is mounted within the stator. The rotor member includes a shaft member, and the rotor member together with the shaft member is rotatably mounted within the stator member so as to be rotatable relative thereto about a predetermined axis of rotation.

Rotor current supply means which include electric contacts are mounted on the shaft member for rotation therewith, and rotational speed responsive control means which also include electric contacts are likewise mounted on the shaft member for rotation therewith.

A support member is connected to the support frame at the free ends of the leg portions thereof, the free ends of the leg portions of the U-shaped support frame and the support member being shaped so that the support member is positioned in a predetermined position relative to the U-shaped support frame. The support member supports first and second contact means for contacting the electric contacts of the rotor current supply means and of the rotational speed responsive control means respectively during rotation thereof together with the shaft member. Each of the leg portions is formed at the free end thereof with a recess, and the first contact means supported by the support member are received at least partially within these recesses.

Electric connector receiving means are mounted on the support member for receiving electric connectors interconnecting the first and second contact means and a source of electric power.

In a preferred embodiment the rotational speed responsive control means includes a substantially disc-shaped base member having two faces. The base member is adapted to be mounted on a motor shaft, such as the rotor shaft of the motor disclosed in the instant application, so as to be rotatable therewith about a predetermined axis of rotation. At least one of the faces lies in a plane substantially normal to the axis.

Preferably, two annular contact members having unequal mean diameters are mounted on the base member. Each of the contact members has an axis coinciding with the predetermined axis and also has a contacting face portion coplanar with the one face of the base member.

The rotational speed responsive control means also includes rotational speed responsive switch means which are mounted on the base member adjacent the face thereof of which is opposite the one face. The rotational speed responsive switch means is electrically connected to the contact members for making and breaking an electric circuit between them.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is an elevational view, partly in section, of a preferred embodiment of the present invention;

Fig. 2 is a sectional view taken along line 2—2 of Fig. 1;

Fig. 3 is a sectional view taken along line 3—3 of Fig. 2;

Fig. 4 is a sectional view taken along line 4—4 of Fig. 2;

Fig. 5 is a fragmentary perspective view of a part of the present invention;

Fig. 6 is a schematic view of a preferred embodiment of a rotational speed responsive control; and Fig. 7 is a simplified wiring diagram.

Referring now to the drawing, and to Figs. 1-6 in particular, there is shown an electric motor having a substantially U-shaped support frame 10 having a base portion and two leg portions. The free end of each of the leg portions is formed with a recess 10a for a purpose to be described below.

Stator plates or laminations 11 are stationarily supported by the frame 10 between the leg portions thereof, and may be cast integrally with the frame or may otherwise be fixedly secured thereto. The stator plates 11 are preferably contained entirely within the space defined by the outside surface of the frame 10 so that a very compact structure is realized.

An end plate support member 13 is mounted on the frame 10 at the free ends of the leg portions thereof and is fixedly secured thereto by means of four screws 25 which pass through the support member 13 and are received by the holes 10b, one of which is shown in Fig. 5, formed in the end faces of the leg portions.

A rotor assembly 11a having a shaft member 11b is arranged within the stator plates 11 so as to be rotatable relative thereto about a predetermined axis of rotation. The shaft member 11b passes through the base portion of the frame 10 and through the support member 13.

As is shown in the drawing, the support member 13 is provided with a stationary ball race 13a and the shaft member 11b is provided with a ball race 11c, and a ring of ball bearings is interposed between the two ball races. A similar arrangement may be provided for so mounting the shaft member 11b in the base portion of the frame 10.

The rotor assembly further comprises rotor current supply means such as a commutator 11d which is fixedly secured to the shaft member 11b and is rotatable therewith.

The shaft member 11b has a projecting portion 16 which is adapted to carry a rotational speed responsive control means which will be described below.

The support member 13 is provided with protruding brush-supporting portions 12 and 20 which are arranged substantially diametrically opposite each other. These portions support brushes 12' and 20' respectively, which brushes are spring-urged toward the commutator 11d so as to contact the same during rotation thereof. As is shown in the drawing, the portions 12 and 20 project into and are received at least partially within the recesses 10a formed at the free ends of the leg portions of the U-shaped frame 10.

The brushes may be made of carbon or any other suitable material.

A rotational speed responsive control means or governor 24 is carried by the shaft 11b at the projecting end 16 thereof. The governor includes a substantially disc-shaped base member 15, which is preferably made of insulating material, and two concentric annular contact members or slip rings 14 which are embedded in the face of the base member 15 which is nearest the support member 13, the arrangement being such that the slip rings are substantially flush with that face of the base member 15 in which they are embedded.

A centrifugal switch S is mounted on the base member 15 adjacent the face thereof furthest away from the support member 13 and includes a stationary contact 15a and a movable contact 15b carried at the free end of a leaf spring 15a which is fixedly secured to the base member 15. The spring 15c urges the contact 15b toward the stationary contact 15a so that when the shaft member 11b rotates below a predetermined speed the switch S will be in its closed circuit condition. When the shaft member 11b rotates at a speed equal to or above this predetermined speed, the centrifugal force acting on the contact 15b will overcome the bias of the spring 15c and move the contact 15b in the direction of the arrow x (Fig. 6) and the switch S will assume its open circuit condition. Each of the contacts 15a and 15b is electrically connected to one of the slip rings 14.

The support member 13 is formed with openings 17' and 23' containing brushes 17 and 23 respectively, which brushes may also be made of carbon or any other suitable material. The brushes 17 and 23 are urged to the right, as viewed in Fig. 1 and 4, by the spring fingers 18 and 22 respectively which are carried by the mounting brackets 19 and 21 respectively. The mounting brackets may either be integral with the support member 13 or may be suitably affixed thereto in any suitable manner.

As may best be seen in Fig. 2, the openings 17' and 23' are spaced from the axis of rotation of the shaft member 11b different distances so that each of the brushes 17 and 23 contacts one of the slip rings 14 during rotation of the governor 24 together with the shaft member 11b.

The support member 13 may also be provided with electric connector receiving means, such as the soldering lugs 26, which are adapted to receive connecting wires whereby the brushes 12', 20, 17 and 23 as well as a suitable source of electric power may be readily interconnected.

The support member 13 and the free ends of the leg portions of the frame 10 are shaped so that when the support member 13 is brought against the free ends of the leg portions, the support member 13 is automatically positioned in a predetermined position relative thereto. This predetermined position is one in which the support member 13 and the frame 10 are arranged so that together they form a sturdy general supporting structure which will properly support the rotor assembly 11a so that the same will be freely rotatable relative to the stator plates 11, thus ensuring noise-free operation at all times. Also, proper position of the brushes 12' and 20' relative to the commutator 11d is assured, as is proper positioning of the brushes 17 and 23 relative to the slip rings 14, so that brush chatter is eliminated.

Fig. 7 shows a simplified wiring diagram whereby the centrifugal switch S may be used to insert a resistance R in the line when a predetermined rotational speed is attained. The switch S is normally closed, so that the resistance R is short-circuited and the full line voltage is impressed across the rotor. When the rotor is above the predetermined speed the switch S will open, in the manner set forth above, so that the resistance R will be in series with the rotor. As a result, part of the line voltage will appear across the resistance R and less than line voltage will be impressed across the stator. The motor speed will therefore decrease until the switch S closes under the action of the spring 15c so that the entire line voltage will once again be impressed across the rotor. The motor speed will then increase and in the event the predetermined rotational speed is again attained, the above cycle will be repeated.

It will be understood that each of the elements described above, or two or more together, may also find a useful application in other types of electric motors differing from the types described above.

While the invention has been illustrated and described as embodied in universal motor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An electric motor comprising, in combination, a U-shaped support frame having a base portion and two leg portions, each of said leg portions being formed at the free end thereof with a recess; a stator stationarily supported by said support frame between said leg portions thereof; a rotor mounted for rotation within said stator and having a shaft member; collector means mounted on said shaft member for rotation therewith; rotational speed responsive control means also mounted on said shaft member for rotation therewith; and a support member connected to said support frame at the free ends of said leg portions thereof and supporting a first and a second pair of brushes for contacting said collector means and said rotational speed responsive control means respectively during rotation thereof together with said shaft member, said first pair of brushes being received at least partially within said recesses formed at said free ends of said leg portions.

2. An electric motor comprising, in combination, a U-shaped support frame having a base portion and two leg portions, each of said leg portions being formed at the free end thereof with a recess; a stator stationarily supported by said support frame between said leg portions thereof; a rotor mounted within said stator and having a shaft member, said rotor and shaft member being rotatable relative to said stator about a predetermined axis of rotation; collector means mounted on said shaft member for rotation therewith; rotational speed responsive control means connected to said shaft member, said rotational speed responsive control means including a base member mounted on said shaft member so as to be rotatable therewith about said predetermined axis, said base member having a face portion lying in a plane substantially normal to said predetermined axis, at least two annular electric contact members having unequal diameters mounted on said base member, each of said electric contact members having an axis coincident with said predetermined axis and also having a contacting face portion coplanar with said face portion of said base member, and rotational speed responsive switch means mounted on said base member and being electrically connected to said electric contact members for making and breaking an electric circuit between said electric contact members; and a support member connected to said support frame at the free ends of said leg portions thereof and supporting a first and a second pair of brushes for contacting said collector means and said electric contact members of said rotational speed responsive control means respectively during rotation thereof together with said shaft member, said first pair of brushes being received at least partially within said recesses formed at said free ends of said leg portions.

3. An electric motor comprising, in combination, a U-shaped support frame having a base portion and two leg portions, each of said leg portions being formed at the free end thereof with a recess; a stator stationarily supported by said support frame between said leg portions thereof; a rotor mounted within said stator and having a shaft member, said rotor and shaft member being rotatable relative to said stator about a predetermined axis of rotation; collector means mounted on said shaft member for rotation therewith; rotational speed responsive control means connected to said shaft member, said rotational speed responsive control means including a base member mounted on said shaft member so as to be rotatable therewith about said predetermined axis, said base member having a face portion lying in a plane substantially normal to said predetermined axis, at least two annular electric contact members having unequal diameters mounted on said base member, each of said electric contact members having an axis coincident with said predetermined axis and also having a contacting face portion coplanar with said face portion of said base member, and rotational speed responsive switch means mounted on said base member and being electrically connected to said electric contact members for making and breaking an electric circuit between said electric contact members; a support member connected to said support frame at the free ends of said leg portions thereof and supporting a first and a second pair of brushes for contacting said collector means and said electric contact members of said rotational speed responsive control means respectively during rotation thereof together with said shaft member, said first pair of brushes being received at least partially within said recesses formed at said free ends of said leg portions; and electric connector receiving means mounted on said support member for receiving electric connectors interconnecting said first and second contact means and a source of electric power.

4. An electric motor comprising, in combination, a U-shaped support frame having a base portion and two leg portions; a stator stationarily supported by said support frame between said leg portions thereof; a rotor mounted for rotation within said stator and having a shaft member; collector means mounted on said shaft member for rotation therewith; rotational speed responsive control means also mounted on said shaft member for rotation therewith; and a support member connected to said support frame at the free ends of said leg portions thereof and supporting a first and a second pair of brushes for contacting said collector means and said rotational speed responsive control means respectively during rotation thereof together with said shaft member, said free ends of said leg portions of said U-shaped support frame and said support member being shaped so that said support member is positioned in a predetermined position relative to said U-shaped support frame.

5. An electric motor comprising, in combination, a stator formed from a plurality of stator laminations; a U-shaped supporting frame having a base portion and two leg portions, each of said leg portions being formed with a groove having a pair of side faces abutting respectively against opposite end laminations of said stator laminations to press said stator laminations tightly against each other and to hold said stator laminations securely within said leg portions, each of said leg portions being further formed at the free end thereof with a recess; a support member formed from insulating material and mounted on said free ends of said leg portions, said support member having a pair of extensions respectively located in said recesses for aligning said support member with said frame; a pair of bearings aligned on an axis normal to said base portion and being respectively mounted in said base portion and in said support member; a shaft member mounted for rotation on said bearings; and a rotor fixed to said shaft member for rotation therewith relative to said stator.

6. An electric motor comprising, in combination, a stator formed from a plurality of stator laminations; a U-shaped supporting frame having a base portion and two leg portions, each of said leg portions being formed with a groove having a pair of side faces abutting respectively against opposite end laminations of said stator laminations to press said stator laminations tightly against each other and to hold said stator laminations securely within said leg portions, each of said leg portions being further formed at the free end thereof with a recess; a support member formed from insulating material and mounted on said free ends of said leg portions, said support member having a pair of extensions respectively located in said recesses for aligning said support member with said frame, each of said extensions being formed with a bore substantially parallel to said base portion of said frame; a pair of bearings aligned on an axis normal to said base portion and being respectively mounted in said base portion and in said support member; a shaft member mounted for rotation on said bearings and having an end portion protruding through said support member; a rotor fixed to said shaft member for rotation therewith relative to said stator; collector means located between said extensions and fixedly mounted on said shaft member for rotation therewith; rotational speed responsive control means connected to said shaft member, said rotational speed responsive control means including a base member mounted on said end portion of said shaft member, said base member having an inner face substantially normal to said axis and facing said support member and an outer face, a pair of slip rings having unequal diameters mounted on said inner face of said base member, each of said slip rings having an axis coincident with said axis of said bearings and having a contacting face portion coplanar with said inner face of said base member, and rotational speed responsive switch means mounted on said outer face of said base member and being electrically connected to said slip rings for making and breaking an electric circuit between said slip rings; a first pair of brushes respectively mounted in said bores and contacting respectively said collector means at opposite points; a pair of brush holders mounted on said inner face of said support member; and a second pair of brushes respectively passing through openings formed in said support member and being pressed by said brush holders against said contacting face portion of said slip rings, whereby said second pair of brushes may be replaced without removing said support member.

7. An electric motor comprising, in combination, a stator formed from a plurality of stator laminations; a U-shaped supporting frame having a base portion and two leg portions, each of said leg portions being formed with a groove having a pair of side faces abutting respectively against opposite end laminations of said stator laminations to press said stator laminations tightly against each other and to hold said stator laminations securely within said leg portions, each of said leg portions being further formed at the free end thereof with a recess; a support member formed from insulating material and mounted on said free ends of said leg portions, said support member having a pair of extensions respectively located in said recesses for aligning said support member with said frame, each of said extensions being formed with a bore substantially parallel to said base portion of said frame; a pair of bearings aligned on an axis normal to said base portion and being respectively mounted in said base portion and in said support member; a shaft member mounted for rotation on said bearings and having an end portion protruding through said support member; a rotor fixed to said shaft member for rotation therewith relative to said stator; collector means located between said extensions and fixedly mounted on said shaft member for rotation therewith; rotational speed responsive control means connected to said shaft member, said rotational speed responsive control means including a base member mounted on said end portion of said shaft member, said base member having an inner face substantially normal to said axis and facing said support member and an outer face, a pair of slip rings having unequal diameters mounted on said inner face of said base member, each of said slip rings having an axis coincident with said axis of said bearings and having a contacting face portion coplanar with said inner face of said base member, and rotational speed responsive switch means mounted on said outer face of said base member and being electrically connected to said slip rings for making and breaking an electric circuit between said slip rings; a first pair of brushes respectively mounted in said bores and contacting respectively said collector means at opposite points; a pair of brush holders mounted on said inner face of said support member; a second pair of brushes respectively passing through openings formed in said support member and being pressed by said brush holders against said contacting face portion of said slip rings, whereby said second pair of brushes may be replaced without removing said support member; and electric connector receiver means mounted on said support member for receiving electrical connectors interconnecting said first pair of brushes and said second pair of brushes and a source of electric power.

References Cited in the file of this patent

UNITED STATES PATENTS

| | | |
|---|---|---|
| 1,822,859 | Perkins | Sept. 8, 1931 |
| 2,032,743 | Evans | Mar. 3, 1936 |
| 2,143,920 | Lee et al. | Jan. 17, 1939 |
| 2,293,996 | Naul | Aug. 25, 1942 |
| 2,420,346 | Anderson | May 13, 1947 |
| 2,477,150 | Snyder et al. | July 26, 1949 |
| 2,523,520 | Reinhard | Sept. 26, 1950 |
| 2,557,208 | Thunberg et al. | June 19, 1951 |
| 2,570,440 | Freiberg et al. | Oct. 9, 1951 |